Feb. 11, 1947.  C. M. OSTERHELD  2,415,523
THERMAL RETARDER UNIT
Filed Sept. 20, 1944  2 Sheets-Sheet 2
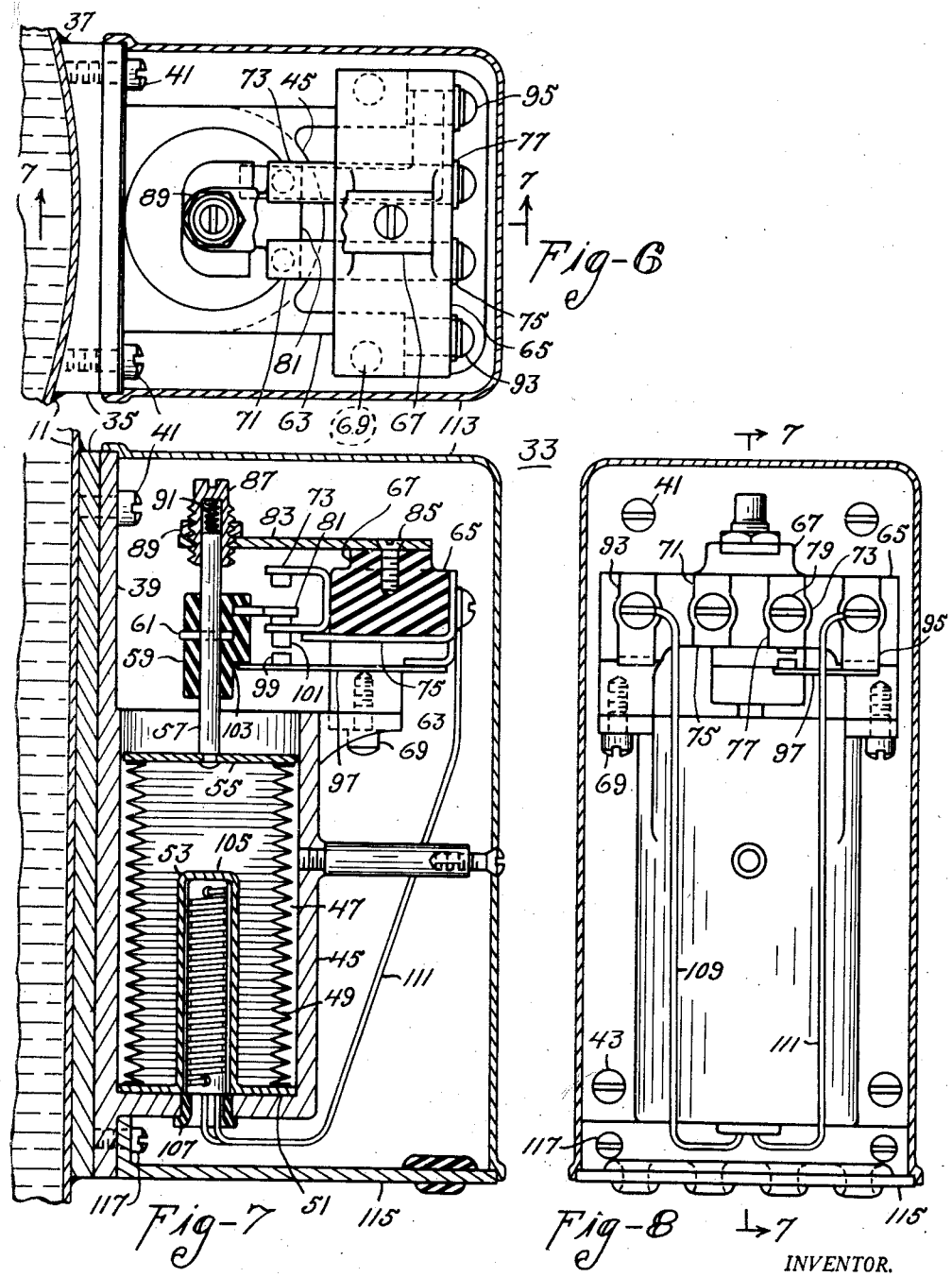
INVENTOR.
CLARK M. OSTERHELD
BY
H. M. Biglel
ATTORNEY Patented Feb. 11, 1947

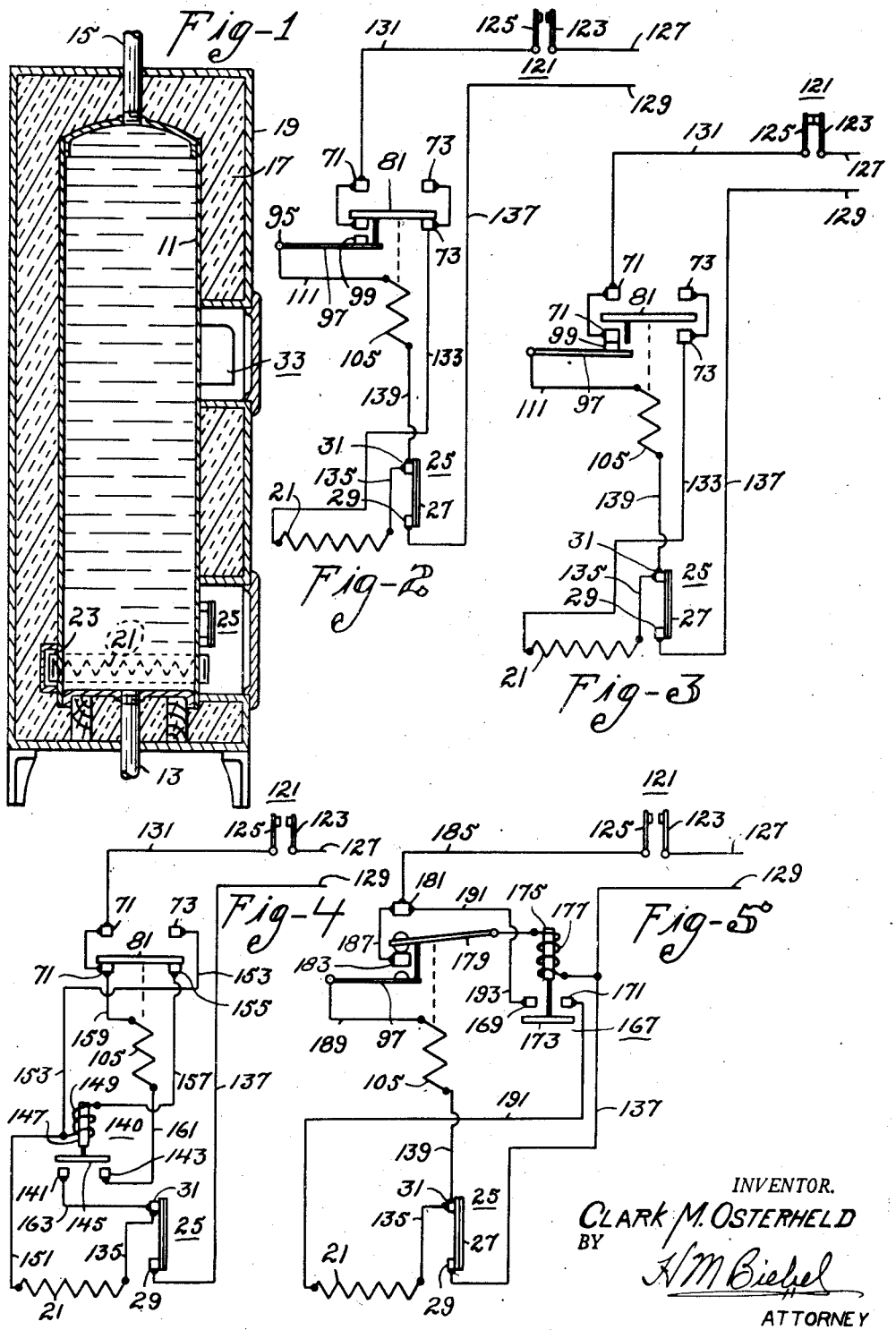

2,415,523

UNITED STATES PATENT OFFICE 2,415,523

THERMAL RETARDER UNIT

Clark M. Osterheld, Stoughton, Wis., assignor to McGraw Electric Company, Elgin, Ill., a corporation of Delaware Application September 20, 1944, Serial No. 555,001

10 Claims. (Cl. 219—39)

My invention relates to electric heater control devices and particularly to thermal retarder heater control switch units.

An object of my invention is to provide a relatively simple, inexpensive, and easily manufactured thermal retarder heater control switch unit to selectively cause immediate energization of the electric heater of a domestic hot water tank or energization of the heater with a predetermined time period of delay in accordance with the amount of cold water in the tank at the start of an off-peak period.

Other objects of my invention will either appear in the course of a description of a device embodying my invention, or will be pointed out in the course of such description and set forth in the appended claims.

In the drawings,

Figure 1 is a vertical, sectional view of a domestic hot water tank, having associated therewith a device embodying my invention, Fig. 2 is a diagram of connections used with the device embodying my invention, showing the contacts in the position when the tank is either entirely full of cold water or is more than half full of cold water, Fig. 3 is a diagram of connections similar to Fig. 2, except that the contacts are shown in the positions occupied by them when the tank is more than half full of hot water, Fig. 4 is a diagram of circuits, showing a different method of control of the heating coil for the thermal retarder, Fig. 5 is a diagram of connections, showing a circuit of a different kind for the thermal retarder heating coil, Fig. 6 is a top plan view of a thermal retarder unit shown in Fig. 7, Fig. 7 is a vertical, sectional view of the thermal retarder unit taken on the line 7—7 of Figs. 6 and 8, and, Fig. 8 is a front view of the device shown in Figs. 6 and 7, with the cover shown in section.

Referring first of all to Fig. 1 of the drawings, I have there shown an ordinary domestic hot water tank 11, having a lower cold water inlet pipe 13, an upper hot water outlet pipe 15, a mass 17 of heat insulation around the tank 11, which heat insulation is held in proper operative position around the tank by an outer casing 19. I provide also, preferably, but not necessarily, a single electric heater 21, which is shown as of the clamp-on type secured around the outside of the tank; and if only a single heater is used, it is to be located adjacent to the bottom end portion of the tank 11. The heater 21 may be located in a tunnel member 23, and I wish to here point out that all of the above detailed elements are old and well known in the art and constitute no part of my present invention.

I provide a lower thermally-actuable heater control switch, designated by numeral 25, and I have shown this switch as comprising a bimetal bar 27, having one end mounted on a contact 29, while the other end thereof is adapted to move into and out of engagement with a second fixed contact 31. The two contacts 31 and 29 and the bimetal bar 27 are adapted to be mounted on the outside of the tank in heat-receiving relation thereto. While I have shown a specific embodiment of a thermally-actuable switch, I do not desire to be limited thereto, since any other form of thermally-actuable switch, operative in the same manner and for the same purpose as the switch 25, may be used instead. The design, construction, and operation of the lower thermally-actuable heater control switch 25 is such that when the lower end portion of the tank is filled with cold water, the bimetal bar 27 will be in engagement with fixed contact 31, while if the lower end portion of the tank contains hot water, it will be out of engagement therewith. When I speak of cold water, I refer to water the temperature of which is on the order of 60° F. to 70° F.; while when I speak of hot water, I refer to water the temperature of which is on the order of 150° F., or slightly over.

I provide a thermal retarder heater control switch unit 33, which is shown in several views in Figs. 6, 7, and 8. I provide a supporting block 35, the inner face of which is of arcuate shape, so that its entire inner surface will be in close heat-receiving relation to and in engagement with the outside surface of the tank 11, and member 35 may be held in proper operative positions as by welding seams 37. The outer surface of supporting block 35 may be of substantially flat planar shape, and a base member 39 of heat-conducting material may be secured against the outer surface of block 35 as by a plurality of machine screws 41 and 43. Member 39 has integral therewith a projecting part 45, the central outer face of which is of substantially arcuate shape and which has extending axially thereof a bore or recess 47. In the bore or recess 47, I locate an expansion chamber or bellows 49, the lower end of which is connected to a plate 51, which has centrally thereof and extending axially thereof a tubular extension 53. The upper end of the bellows 49 has secured thereto a substantially circular plate 55, the joint between the lower member 51 and the bellows 49 and between the upper member 55 and the bellows 49 being fluid and gas tight, and I fill the closed expansion bellows with a suitable volatilizable material well known in the art, which will operate in the desired manner to be hereinafter set forth.

The upper closure plate 55 has mounted thereon an upwardly-extending rod 57, which has positioned thereon intermediate its ends a block 59 of electric-insulating material, which is held in proper operative position on rod 57 by a pin 61 extending partly through block 59 and through rod 57.

Member 45 is provided with two integral, horizontally-extending side portions 63, which are adapted to support a block 65 of electric-insulating material, which is of substantially inverted U-shape and which has on its upper surface a projecting central portion 67. Member 65 may be held on the side portion 63 by short machine screws 69.

A plurality of contact members are supported on block 65 in spaced relation relatively to each other. These fixed contacts comprise two main central contacts 71 and 73 which are each of substantially U-shape, as may be seen in Fig. 7, and which are secured to electric-conducting terminal members 75 and 77 of L-shape, secured to the front surface of block 65 as by screws 79.

Block 59 has mounted thereon and extending forwardly therefrom a contact bridging member 81, which is adapted to engage the contacts 71 and 73, either at the lower leg portion or at the upper leg portion, in accordance with the vertical position of rod 57 and block 59 and as moved thereinto by the expanding and contracting bellows 49. The projection 67 on block 65 has mounted thereon a guide bar 83 secured thereto by a screw 85, the inner end of bar 83 overhanging and surrounding the rod 57 and being provided with an opening therein, coaxially aligned with rod 57, in which opening there is mounted a hollow adjusting member 87, having screw-threaded engagement with member 83 and being adapted to be held in adjusted position by a lock nut 89. A small spring 91 is positioned in the tubular member 87, so as to provide an opposing spring pressure of predetermined value against upward movement of rod 57.

I provide further two fixed contact terminals 93 and 95 adjacent to the ends of block 65, contact member 95 having secured thereto an inwardly-extending metal bar 97, which has mounted thereon a contact 99 adapted to be engaged with a depending contact 101 on contact 73. Block 59 has a shoulder portion 103 at its lower face, which shoulder portion is adapted to be engaged by bar 97, so that when the length of the bellows or the expansion chamber 49 is a minimum, the contacts 99 and 101 will be out of engagement with each other, but upon temperature rise of the bellows 49 an increase of its overall length will cause engagement of the two contacts 99 and 101, the bar 97 being biased normally upwardly, so as to hold the two contacts 99 and 101 in engagement with each other when permitted to do so by upward movement of block 59.

Tubular member 53 has positioned therein a small heating coil 105, which may be mounted on an insulating support 107. The amount of energy translated into heat in heating coil 105 is relatively small, so that the desired maximum temperature to which it can heat the material in the expansion chamber will not be reached in less than say four hours after starting energization. Two conductors 109 and 111 connect the terminals of heating coil 105 to contact terminals 93 and 95. I provide a cover 113 for the thermal retarder and provide further a lower plate 115 to complete the enclosure of the thermal retarder unit, this bottom plate 115 being held by screws 117.

Referring now to Fig. 2 of the drawings, I have there shown a diagram of connections used with the thermal retarder shown in Figs. 6, 7, and 8.

I provide a time-controlled switch 121, comprising a first contact arm 123 and a second contact arm 125, which contact arms are adapted to be held out of engagement with each other during all on-peak periods of a twenty-four hour day and to be held in engagement with each other during all off-peak periods of a twenty-four hour day by a continuously operating timing mechanism of any well known kind now used in the art. I provide two supply circuit conductors 127 and 129, of which conductor 127 is electrically connected with contact arm 123. Contact arm 125 is connected by a conductor 131 to the two contacts 71. The contacts 73 are connected by a conductor 133 with one terminal of the electric heater 21, the other terminal of which is connected by a conductor 135 with fixed contact 31. Contact 29 is connected by a conductor 137 to the second supply circuit conductor 129. The one terminal of heating coil 105, connected with the fixed contact 95, is connected to the resilient contact arm 97 by conductor 111, as has already been hereinbefore set forth, while the other terminal of heating coil 105 is connected by a conductor 109 with contact 31.

Let it now be assumed that the tank is more than half full of cold water, so that the thermal retarder unit will be subject to cold water, with the result that contact bridging member 81 will be in engagement with the lower of the two contacts 71 and 73, as shown in Fig. 2 of the drawings. If this condition obtains during on-peak time, the heater circuit will not be energized, because of the fact that the two contact arms 123 and 125 of the time-controlled switch are out of engagement with each other, but since the switch is closed at the start of an off-peak period, which for illustrative purposes may be considered to start at 10 p. m. or 11 p. m., the following circuit will be energized: from supply circuit conductor 127 through closed switch 121, conductor 131, contact members 71, bridging member 81 to one of the contacts 73, through conductor 133, electric heater 21, conductor 135, through closed switch 25, and through conductor 137 to the second supply circuit conductor 129. Thus, if the tank is either completely filled with cold water, or more than half full of cold water, energization of heater 21 will occur immediately after closing of the time-controlled switch at the start of an off-peak period.

This energization of heater 21 will continue until enough additional water has been heated to a temperature on the order of 150° F. to subject the thermal retarder switch unit to hot water. The hereinbefore mentioned spring 91, opposing the upward movement of rod 57, helps in preventing disengagement of bridging member 81 from the lower contacts 71 and 73, in accordance with the relatively large change and increase of temperature of the expansion bellows, which, as was hereinbefore set forth, is in good heat-conducting relation with the water in the tank; and I may here point out that, preferably, the thermal retarder unit is positioned at substantially the half-height of the tank, although I do not desire to be limited to this one position.

When the thermal retarder switch unit is subject to hot water, contact bridging member 81 will be moved into the position shown in Fig. 3 of the drawings, with the result that energization of heater 21 is interrupted. An energizing circuit is, however, closed through the heating coil 105, this circuit being traceable as follows: from supply circuit conductor 127, through closed switch 121, conductor 131, to the two contacts 71, from and through resilient arm 97, conductor 111, heating coil 105, conductor 139, and through closed switch 25 and conductor 137, to the second supply circuit conductor 129. The energization of heating coil 105 will result in increasing the temperature of the expansion chamber in a predetermined time, which may be on the order of four hours, or even less, so that at the end of the predetermined time, a temperature on the order of 250° F. will have been reached, with the result that bridging member 81 is moved into engagement with the upper contacts 71 and 73, whereby re-energization of the heater 21 is effected.

This energization of heater 21 will continue until either substantially all of the water in the tank is hot, when the lower thermally-actuable switch 25 will deenergize heater 21, if this happens before the end of an off-peak period. If, however, for any reason, less than all of the water in the tank is hot at the end of an off-peak period, switch 25 will still be in closed position and deenergization of heater 21 will be effected by the time-controlled switch 121 at the end of an off-peak period.

Referring now to Fig. 4 of the drawings, I have there shown a modified form of control for the heating coil 105. In this diagram I provide an electromagnetic relay 140, comprising a pair of fixed contacts 141 and 143, which are adapted to be engaged by and be disengaged from a bridging member 145, which is connected with a magnetizable armature core 147, adapted to be energized by a coil 149. One terminal of coil 149 is connected by a conductor 151 to one terminal of heater 21 and by a second conductor 153 to the upper contact 73. In this diagram, the lower contact, which was numbered 73 in Figs. 2 and 3, is not now connected with the upper contact; and I have therefore designated it as contact 155. Contact 155 is connected by a conductor 157 to the other terminal of coil 149. The other terminal of heating coil 105 is connected by a conductor 159 to the two contacts 71.

When the time-controlled switch is closed at the start of an off-peak period, and assuming that the thermal retarder unit is subject to cold water, with engagement of the bridging member 81 with the lower contact 71 and contact 155, the following energizing circuit through heater 21 will be established: from the first supply circuit conductor 127, through closed switch 121, through conductor 131 to contacts 71, contact bridging member 81, contact 155, conductor 157, coil 149, conductor 151, heater 21, conductor 135, closed switch 25, and through conductor 137 to the second supply circuit conductor 129.

The other terminal of heating coil 105 is connected to fixed terminal 143 by a conductor 161, while contact 141 is connected by a conductor 163 with fixed contact 31. The energized coil 149, traversed by the current traversing heater 21, causes upward movement of the core 147 and of the bridging member 145, whereby the energizing circuit of heating coil 105, traceable as follows, is interrupted: from supply circuit conductor 127, through closed switch 121, conductor 131, contacts 71, conductor 159, heating coil 105, conductor 161, through contacts 143 and 141 with bridging member 145, conductor 163, closed switch 25, and through conductor 137 to the second supply circuit conductor 129. This circuit is, of course, established when coil 149 carries no current.

Energization of heater 21 will continue until enough water has been heated to subject the thermal retarder unit to hot water, when contact bridging member 81 will be moved upwardly out of engagement with the fixed contacts 71 and 155, whereby energization of coil 149 will be interrupted. When this happens, contact bridging member 145 will drop downwardly into engagement with the fixed contacts 141 and 143, with the result that heating coil 105 is energized. Energized heating coil 105 causes temperature rise of the expansion chamber so that at the end of a predetermined period of time, say three or four hours, the temperature of the expansion chamber will be on the order of 250° F., with the result that contact bridging member 81 is moved into engagement with the upper contacts 71 and 73, whereby a new energizing circuit for heater 21 is established, traceable as follows: from supply circuit conductor 127 through closed switch 121, conductor 131, through the upper contacts 71 and 73, and engaging bridging member 81, through conductors 153 and 151, heater 21, conductor 135, and through closed switch 25 and conductor 137 to the second supply circuit conductor 129.

Energization of heater 21 will continue until substantially all of the water in the tank is hot, at which time lower thermally-actuable switch 25 will deenergize heater 21, if this condition occurs before opening of the time-controlled switch 121. If less than substantially all of the water in the tank is hot at the end of an off-peak period for any reason whatever, energization of heater 21 will be interrupted by the time-controlled switch 121.

Referring now to Fig. 5 of the drawings, I have there shown a slightly modified diagram of circuit connections which may be used. I provide an electromagnetic relay or contactor 167, which comprises a pair of fixed contacts 169 and 171 adapted to be engaged by and disengaged from a contact bridging member 173, which is insulatedly supported by an armature core 175 adapted to be energized by a coil 177. A switch for controlling the energization of coil 177 is shown as a pivotally mounted contact arm 179 adapted to engage an upper contact member 181 and a lower contact member 183, being moved into these respective positions by the expansion chamber 49. Contact arm 125 of the time switch is connected by a conductor 185 with contact 181, and a conductor 187 connects contacts 181 and 183 to each other. Resilient contact arm 97 is adapted to engage with and be disengaged from contact 183 and is connected by a conductor 189 with one terminal of heating coil 105, the other terminal of which is connected with contact 31 by a conductor 139. One terminal of heating coil 21 is connected by a conductor 191 to fixed contact 171, while contact 169 is connected by a conductor 193 to fixed contact 181. One terminal of coil 177 is connected to conductor 137, while the other terminal is connected to contact arm 179.

Let it now be assumed that the time-controlled switch 121 has been moved to closed position by the timer at the start of an off-peak period and that contact arm 179 is in engagement with the lower contact 183 by reason of the fact that thermal retarder switch unit is subject to cold water in the tank. Under these conditions energization of the heater 21 will occur through a circuit established by energization of coil 177 of the contactor 167 and engagement of bridging member 173 with contacts 169 and 171 traceable as follows: from supply circuit conductor 127, through closed switch 121, through conductor 185 to contact 181, conductor 191, through the engaged contacts 169 and 171 with bridging member 173, through conductor 191, heater 21, conductor 135, closed switch 27, and through conductor 137 to the second supply circuit conductor 129. This circuit has been established, as has already been hereinbefore stated, because of the energization of coil 177 through a circuit as follows: from supply circuit conductor 127, closed switch 121, conductor 185, contact 181, conductor 187, contact 183, contact arm 179, coil 177, to the second supply circuit conductor 129.

This energization of heater 21 will continue for a length of time sufficient to heat enough water in the tank to subject the thermal retarder unit to hot water, when contact arm 179 will be moved to the position shown in Fig. 5 by broken lines, so that it is out of engagement with the two contacts 183 and 181. When this happens, contact arm 97 will move upwardly into engagement with contact 183, whereby an energizing circuit is closed through heating coil 105, traceable as follows: from supply circuit conductor 127, through closed switch 121, conductor 185, contact 181, conductor 187, contact 183, contact arm 97, conductor 189, heating coil 105, conductor 139, closed switch 25, and through conductor 137 to the second supply circuit conductor 129.

The energization of heating coil 105 will cause temperature rise of the expansion chamber, with the result that in a period of time on the order of three or four hours, the temperature of expansion chamber 49 will have been raised to a value sufficient to cause the expansion chamber to move contact arm 179 into engagement with contact 181, whereby coil 177 is energized, resulting in engagement of bridging member 173 with contacts 169 and 171 and attendant energization of heater 21 through substantially the same circuit as hereinbefore set forth. This energization of heater 21 will continue until either substantially all of the water in the tank is hot and the heater is deenergized by switch 25, if this occurs before the end of an off-peak period; or if less than all of the water in the tank is hot at the end of an off-peak period, opening of the time-controlled switch will deenergize heater 21.

The device embodying my invention is therefore effective to selectively energize an electric heater for a domestic hot water storage tank, either immediately at the start of an off-peak period, or after a predetermined time period of delay, in accordance with the amount of cold water in the tank at the start of an off-peak period.

Various modifications may be made in the device embodying my invention without departing from the spirit and scope thereof, and all such modifications coming clearly within the scope of the appended claims shall be considered as covered thereby.

I claim as my invention:

1. A thermal retarder switch unit for hot water storage tank heaters, comprising a thermo-responsive expansion chamber adapted to be mounted in heat-receiving relation with the water in a tank, switching means operable by said expansion chamber having two opposite closed positions and an intermediate open position and means independent of the tank for exchanging heat with the expansion chamber.

2. A thermal retarder switch unit for hot water storage tank heaters comprising a thermo-responsive expansion chamber adapted to be mounted in heat-receiving relation with the water in a tank, switching means operable by said expansion chamber having two opposite closed positions and an intermediate open position and means independent of the tank for raising the temperature of said expansion chamber.

3. A thermal retarder switch unit for hot water storage tank heaters comprising a thermo-responsive expansion chamber adapted to be mounted in heat-receiving relation with the water in a tank, switching means operable by said expansion chamber having two opposite closed positions and an intermediate open position and normally located in a first closed position and movable into open position and then into a second closed position in accordance with predetermined temperature increases of said expansion chamber.

4. A thermal retarder switch unit for hot water storage tank heaters, comprising a thermo-responsive expansion chamber adapted to be mounted in heat-receiving relation with the water in a tank, switching means operable by said expansion chamber having two opposite closed positions and an intermediate open position and means independent of the tank for exchanging heat with the expansion chamber, said switching means being normally located in a first closed position when the expansion chamber is subject to cold water in the tank and movable into open position and then into a second closed position in accordance with predetermined temperature increase of said expansion chamber.

5. A thermal retarder switch unit for a hot water storage tank heater, comprising a thermo-responsive expansion chamber adapted to be mounted in heat-receiving relation with the water in a tank, switching means operable by said expansion chamber having two opposite closed positions and an intermediate open position and a heating coil for said expansion chamber, said switching means being held in a first closed position when said expansion chamber is subject to cold water in the tank, being moved in open position when said expansion chamber is subject to hot water in the tank and being moved into a second closed position with a predetermined time period of delay after energization of said heating coil.

6. A thermal retarder switch unit for hot water storage tank heaters comprising a thermo-responsive expansion chamber adapted to be mounted in heat-receiving relation with the water in a tank, switching means operable by said expansion chamber having two opposite closed positions and an intermediate open position and a heating coil for said expansion chamber, the energization of which is controlled by said expansion chamber.

7. A thermal retarder switch unit for hot water storage tank heaters comprising a thermo-responsive expansion chamber adapted to be mounted in heat-receiving relation with the water in a tank, switching means operable by said expansion chamber having two opposite closed positions and an intermediate open position and a heating coil for said expansion chamber adapted to be deenergized with the expansion chamber is subject to cold water in the tank and to be energized when the expansion chamber is subject to hot water in the tank.

8. A thermal retarder switch unit for hot water storage tank heaters, comprising a thermo-responsive expansion chamber adapted to be mounted in heat-receiving relation with the water in a tank, switching means operable by said expansion chamber having two opposite closed positions and an intermediate open position, a heating coil for said expansion chamber and means controlled by said expansion chamber for causing deenergization of said heating coil when the expansion chamber is subject to cold water in the tank and for causing energization of said heating coil when the expansion chamber is subject to hot water in the tank.

9. A thermal retarder heater control switch unit for a hot water storage tank electric heater, comprising a single thermo-responsive expansion chamber adapted to be mounted in heat-receiving relation with the water in a tank intermediate the ends thereof and switching means controlled by said expansion chamber to prevent energization of said heater until after the elapse of a predetermined length of time after entry of a predetermined relatively small quantity of cold water into the tank.

10. A thermal retarder switch unit for a hot water storage tank heater comprising a thermo-responsive expansion chamber, a heating coil for said expansion chamber, switching means actuable by said expansion chamber comprising two pairs of electrically connected fixed contact members, a contact bridging member and a contact arm movable by said expansion chamber, said contact bridging member being in engagement with two fixed contact members and said contact arm being out of engagement with one of said fixed contact members to cause energization of said heater when said expansion chamber is at a relatively low temperature, said contact bridging member being out of engagement with said fixed contact members and said contact arm being in engagement with said one fixed contact member when said expansion chamber is at an intermediate temperature and said contact bridging member being in engagement with the other two fixed contact members when the temperature of said expansion chamber is at a relatively high value.

CLARK M. OSTERHELD.

REFERENCES CITED

The following references are of record in the file of this patent:

UNITED STATES PATENTS

| Number | Name | Date |
| --- | --- | --- |
| 2,073,286 | Raney | Mar. 9, 1937 |
| 2,304,103 | Kelly | Dec. 8, 1942 |